United States Patent
Lee et al.

(10) Patent No.: US 9,361,706 B2
(45) Date of Patent: Jun. 7, 2016

(54) REAL-TIME OPTICAL FLOW SENSOR DESIGN AND ITS APPLICATION TO OBSTACLE DETECTION

(75) Inventors: Dah-Jye Lee, American Fork, UT (US); Zhaoyi Wei, Mesa, AZ (US)

(73) Assignee: Brigham Young University, Provo, UT (US)

( * ) Notice: Subject to any disclaimer, the term of this patent is extended or adjusted under 35 U.S.C. 154(b) by 1245 days.

(21) Appl. No.: 12/651,907

(22) Filed: Jan. 4, 2010

(65) Prior Publication Data

US 2011/0128379 A1 Jun. 2, 2011

Related U.S. Application Data

(60) Provisional application No. 61/265,293, filed on Nov. 30, 2009.

(51) Int. Cl.
| | | |
|---|---|---|
| *G06T 7/00* | (2006.01) | |
| *G06T 7/20* | (2006.01) | |
| *G06K 9/00* | (2006.01) | |

(52) U.S. Cl.
CPC .......... *G06T 7/2066* (2013.01); *G06K 9/00805* (2013.01); *G06T 7/0071* (2013.01); *G06T 7/2006* (2013.01); *G06T 2200/28* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 5,581,250 A | 12/1996 | Khvilivitzky | |
| 6,320,843 B1 * | 11/2001 | Rydbeck | H04L 1/0003 370/207 |
| 6,332,006 B1 * | 12/2001 | Rydbeck | H04L 1/007 370/209 |
| 6,366,734 B1 * | 4/2002 | Beran | G01C 11/025 348/146 |
| 6,374,047 B1 * | 4/2002 | Beran | G01C 11/025 348/146 |
| 6,384,905 B1 * | 5/2002 | Barrows | 356/28 |
| 6,477,326 B1 * | 11/2002 | Partynski | G01C 11/025 348/146 |
| 6,512,472 B1 * | 1/2003 | Smith | H03M 1/129 341/155 |
| 6,658,207 B1 * | 12/2003 | Partynski | G01C 11/025 348/144 |
| 7,039,521 B2 * | 5/2006 | Hortner et al. | 701/436 |
| 7,224,715 B1 * | 5/2007 | Barman | H04B 1/707 375/141 |
| 7,230,640 B2 * | 6/2007 | Regensburger et al. | 348/115 |

(Continued)

OTHER PUBLICATIONS

Zehang Sun, On-Road Vehicle Detection: A Review, IEEE Transactions on Pattern Analysis and Machine Intelligence, vol. 28, No. 5, May 2006.*

(Continued)

*Primary Examiner* — Ninos Donabed
(74) *Attorney, Agent, or Firm* — Austin Rapp & Hardman

(57) ABSTRACT

The present disclosure relates generally to optical flow algorithms. Section 1 of the present disclosure describes an optical flow algorithm with real-time performance and adequate accuracy for embedded vision applications. This optical flow algorithm is based on a ridge estimator. Sections 2 and 3 describe an obstacle detection algorithm that utilizes the motion field that is output from the optical flow algorithm. Section 2 is focused on unmanned ground vehicles, whereas section 3 is focused on unmanned aerial vehicles.

11 Claims, 7 Drawing Sheets

(56) References Cited

U.S. PATENT DOCUMENTS

| | | | |
|---|---|---|---|
| 7,602,278 B2* | 10/2009 | Prost-Fin et al. | 340/438 |
| 7,659,967 B2* | 2/2010 | Barrows et al. | 356/28.5 |
| 2001/0030990 A1* | 10/2001 | Rouphael | H04B 1/707 375/142 |
| 2001/0044294 A1* | 11/2001 | Khayrallah | H04M 15/00 455/406 |
| 2003/0099216 A1* | 5/2003 | Nilsson | H04B 7/0634 370/335 |
| 2005/0036555 A1* | 2/2005 | Ramakrishnan | 375/240.25 |
| 2007/0210953 A1 | 9/2007 | Abraham et al. | |
| 2008/0089557 A1* | 4/2008 | Iwaki et al. | 382/106 |
| 2008/0129751 A1* | 6/2008 | Lyons | 345/619 |
| 2009/0243889 A1* | 10/2009 | Suhr | G06K 9/00812 340/932.2 |
| 2009/0309966 A1* | 12/2009 | Chen et al. | 348/135 |
| 2010/0177936 A1* | 7/2010 | Ebling et al. | 382/107 |
| 2010/0272208 A1* | 10/2010 | Feigin | H04L 27/3863 375/268 |
| 2011/0128379 A1* | 6/2011 | Lee | G06K 9/00805 348/144 |
| 2011/0293049 A1* | 12/2011 | Niewczas | H04L 27/0014 375/344 |

OTHER PUBLICATIONS

Zhaoyi Wei, Real-Time Optical Flow Sensor Design and Its Application on Obstacle Detection, Brigham Young University, Aug. 2009.*

H. Knutsson, "Representing local structure using tensors," in The 6th Scandinavian Conference on Image Analysis, Oulu, Finland, Jun. 1989, pp. 244-251, report LiTH-ISY-I-1019, Computer Vision Laboratory, Linkoping University, Sweden, 1989. 14, 32.

H. Liu, R. Chellappa, and A. Rosenfeld, "Accurate dense optical flow estimation using adaptive structure tensors and a parametric model," IEEE Transactions on Image Processing, vol. 12, pp. 1170-1180, Oct. 2003.

G. Farneback, "Spatial domain methods for orientation and velocity estimation," Dept. EE, Linkoping University, SE-581 83 Linkoping, Sweden, Lic. Thesis LiU-Tek-Lic-1999:Mar. 13, 1999, thesis No. 755, ISBN 91-7219-441-3. 14, 32.

G. Farneback, "Fast and accurate motion estimation using orientation tensors and parametric motion models," in Proceedings of 15th International Conference on Pattern Recognition, Barcelona, Spain, Sep. 2000, pp. 135-139.

B. Jahne, H.W. Haussecker, H. Scharr, H. Spies, D. Schmundt, and U. Schurr, "Study of dynamical processes with tensor-based spatiotemporal image processing techniques," in ECCV '98: Proceedings of the 5th European Conference on Computer Vision—vol. II. London, UK: Springer-Verlag, 1998, pp. 322-336.

G. Farneback, "Very high accuracy velocity estimation using orientation tensors, parametric motion, and simultaneous segmentation of the motion field," in Proceedings of the Eighth IEEE International Conference on Computer Vision, vol. I, Vancouver, Canada, Jul. 2001, pp. 171-177.

A. Najmi, A. Mahrane, D. Esteve, and G. Vialaret, "A scanning LIDAR system for obstacle avoidance in automotive field," in Proceedings of the 3rd IEEE Conference on Control Application, Aug. 1994, pp. 379-384.

J. Borenstein and Y. Koren, "The vector field histogram—fast obstacle avoidance for mobile robots," IEEE Trans. on Robotics and Automation, vol. 7, No. 3, 1991.

A. Kosaka and A. Kak, "Fast vision-guided mobile robot navigation using model-based reasoning and prediction of uncertainties," in Proceedings of International Conference on Intelligent Robots and Systems, Raleigh, NC, Jul. 1992, pp. 2177-2186.

M. Meng and A. Kak, "NEURO-NAV: a neural network based architecture for vision-guided mobile robot navigation using non-metrical models of the environment," in Proceedings of International Conference on Robotics and Automation, Atlanta, GA, May 1993, pp. 750-757.

I. Ulrich and J. Borenstein, "VFH+: Reliable obstacle avoidance for fast mobile robots," in Proceedings of the 2000 IEEE Conference on Robotics and Automation, Leuven, Belgium, May 1998.

Z.Y. Wei, D.J. Lee, B.E. Nelson, J.K. Archibald, and B.B. Edwards, "FPGA-Based Embedded Motion Estimation Sensor," International Journal of Reconfigurable Computing, vol. 2008, Article ID 636145, 8 pages, doi:10.1155/2008/636145, Jul. 2008.

Z.Y. Wei, D.J. Lee, and B.E. Nelson, "FPGA-based Real-time Optical Flow Algorithm Design and Implementation," Journal of Multimedia, vol. 2/5, p. 38-45, Sep. 2007.

Z.Y. Wei, D.J. Lee, B.E. Nelson, and J.K. Archibald, "Real-time Accurate Optical Flow-based Motion Sensor," IEEE International Conference on Pattern Recognition (ICPR), Tampa, FL, USA, p. 1-4, doi: 10.1109/ICPR.2008.4761126, Dec. 8-11, 2008.

http://www.barnardmicrosystems.com/L4E_sense_and_avoid. htm#Collision (accessed Jan. 5, 2012).

http://jeffreybyrne.com/docs/byrne-gomac05.pdf (accessed Jan. 5, 2012).

Zhao-Yi Wei, Dah-Jye Lee, and Brent E. Nelson, "A Hardware-Friendly Adaptive Tensor Based Optical Flow Algorithm," G. Bebis et al. (Eds.): ISVC 2007, Part II, LNCS 4842, pp. 43-51, 2007.

* cited by examiner

REAL-TIME OPTICAL FLOW SENSOR DESIGN AND ITS APPLICATION TO OBSTACLE DETECTION

PRIORITY CLAIM

This application claims priority from U.S. Provisional Patent Application Ser. No. 61/265,293, filed Nov. 30, 2009, for "Real-Time Optical Flow Sensor Design And Its Application To Obstacle Detection," with inventors Dah-Jye Lee and Zhaoyi Wei.

BACKGROUND

The present disclosure relates generally to optical flow algorithms. Optical flow algorithms aim to measure a motion field from the apparent motion of a brightness pattern. Optical flow is widely used in 3D vision tasks such as egomotion estimation, Structure from Motion (SfM), motion segmentation, etc. One common limitation of optical flow is the computational power requirement. The calculation time of existing optical flow algorithms is typically on the order of seconds or even longer per frame. This long processing time thus prevents optical flow algorithms from many real-time applications such as autonomous navigation for unmanned vehicles.

SUMMARY

Section 1 of the present disclosure describes an optical flow algorithm with real-time performance and adequate accuracy for embedded vision applications. This optical flow algorithm is based on a ridge estimator. Sections 2 and 3 describe an obstacle detection algorithm that utilizes the motion field that is output from the optical flow algorithm. Section 2 is focused on unmanned ground vehicles, whereas section 3 is focused on unmanned aerial vehicles.

DETAILED DESCRIPTION

1. Optical Flow Algorithm

1.1 Algorithm Formulation

Figure 1:
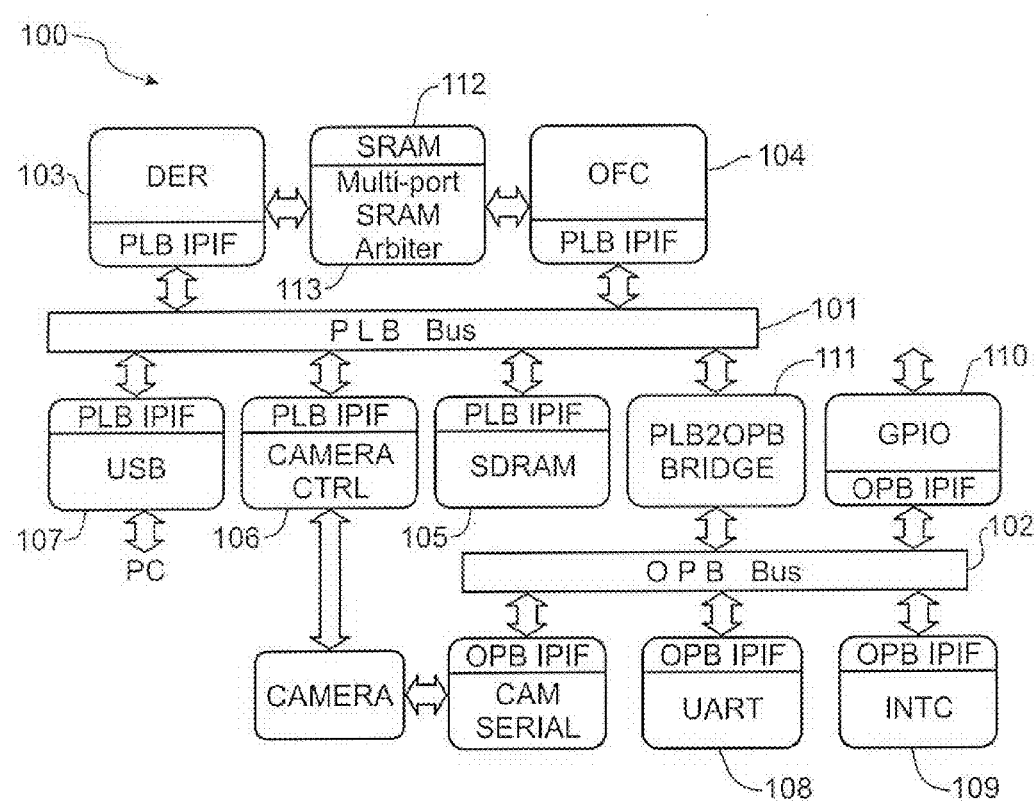
FIG. 1 illustrates an example of an optical flow sensor that implements the ridge-regression tensor-based optical flow algorithm that is described in section 1.1 of the present disclosure.

The basic assumption of optical flow algorithms is the Brightness Constancy Constraint (BCC) which can be formulated as:

$$I(x,y,t)=I(x+\Delta x, y+\Delta y, t+\Delta t) \quad (1.1)$$

where $I(x, y, t)$ is the intensity of pixel $(x,y)$ at frame $t$ and $I(x+\Delta x, y+\Delta y, t+\Delta t)$ is the intensity of the corresponding pixel at frame $t+\Delta t$.

Based on the BCC, an equation regarding derivatives $g_x$, $g_y$, and $g_t$ and velocity components $v_x$ and $v_y$ may be derived as:

$$g_x v_x + g_y v_y + g_t + \epsilon = 0$$

$$\Rightarrow -g_t = g_x v_x + g_y v_y + \epsilon \quad (1.2)$$

where $$v_x = \frac{\Delta x}{\Delta t},$$

$$v_y = \frac{\Delta y}{\Delta t},$$

and $\epsilon$ is the error accounting for the higher order terms and noise. Each pixel in the image has one set of observations $g_{ti}$, $g_{xi}$, $g_{yi}$. In a small neighborhood of n pixels, it is assumed that they all have the same velocity $v_x$ and $v_y$. Then the n set of observations for these n pixels can be expressed as:

$$g_t = g_x(-v_x) + g_y(-v_y) + \epsilon \quad (1.3)$$

where $g_t=(g_{t1}, g_{t2}, \ldots, g_{tn})^T$, $g_x=(g_{x1}, g_{x2}, \ldots g_{xn})^T$, $g_y=(g_{y1}, g_{y2}, \ldots g_{yn})^T$, $\epsilon=(\epsilon_1, \epsilon_2, \ldots \epsilon_n)^T$.

It is assumed that the expectation of $\epsilon_j$ satisfies $E(\epsilon_j)=0$ and the variance is $\sigma^2$, i.e., $\epsilon \sim (0,\sigma^2)$. Denoting $Y^{n\times 1}=g_t$, $X^{n\times 2}=(g_x, g_y)$, $\theta=-(v_x,v_y)^T$, the equation regarding the observation $(g_{ti}, g_{xi}, g_{yi})$ and the parameter $\theta$ can be written as:

$$Y=X\theta+\epsilon \quad (1.4)$$

A normal least squares solution of $\theta$ in equation (1.4) is:

$$\hat{\theta}_{LS}=(X^T X)^{-1} X^T Y \quad (1.5)$$

It can be shown that $E(\hat{\theta}_{LS})=\theta$, and that its covariance matrix is $\text{Cov}(\hat{\theta}_{LS})=\sigma^2(X^T X)^{-1}$. If $g_x$ and $g_y$ exhibit near linear dependency (i.e., one vector is nearly a scale of the other), small amounts of noise in the observation will cause relatively large changes in the inversion $(X^T X)^{-1}$, and produce very large and inaccurate motion vectors. For hardware-based algorithms, because of resource limitations, the vector length n is usually much smaller than in software-based algorithms. This, in turn, increases the possibility of a collinear $(X^T X)$ matrix. The resulting abnormal motion vectors will have a negative impact on neighboring motion vectors in the subsequent smoothing process.

One simple solution is to simply restrict the magnitude of each motion vector, but this is not an optimal solution. In the present disclosure, a ridge estimator is proposed to address this:

$$\hat{\theta}_{RE}=(X^T X+kI_p)^{-1} X^T Y \quad (1.6)$$

In equation (1.6), $I_p$ is a unit matrix of the same size as $X^T X$ where p equals two in this case. The term k is a weighting scalar for $I_p$. It can be shown that the expectation and covariance matrices of $\hat{\theta}_{RE}$ are:

$$E(\hat{\theta}_{RE}) = \theta - k(X^T X + kI_p)^{-1}\theta \qquad (1.7)$$

$$Cov(\hat{\theta}_{RE}) = \sigma^2 X^T X (X^T X + kI_p)^{-2} \qquad (1.8)$$

Although a ridge estimator is biased (i.e., $E(\hat{\theta}_{RE}) \neq \theta$ as shown in equation (1.7)), it is better than a least squares estimator if evaluated based on risk instead of observed loss. Risk is defined as the expectation of loss which is independent of the observed Y.

As to the selection of k, an HKB estimator shown as $$k = \frac{p\hat{\sigma}^2}{\hat{\theta}_N^T \hat{\theta}_N} \qquad (1.9)$$

may be chosen. The term $\hat{\theta}_N$ is the estimate right above the current pixel and it is preset to $(1,1)^T$ on the first row. The error variance is estimated as:

$$\hat{\sigma}^2 = \frac{(Y - X\hat{\theta}_N)^T (Y - X\hat{\theta}_N)}{n - p} \qquad (1.10)$$

There exist other methods to estimate the scalar (e.g., an iterative HK estimator, an LW estimator, etc.). The HKB estimator may be chosen for its efficiency and non-iterative property. After obtaining k, the optical flow is estimated using equation (1.6).

An n-by-n weighting matrix W may be used to assign weights to each set of observations based on their distance to the central pixel. Equations (1.6) and (1.10) may be rewritten as:

$$\hat{\theta}_{RE} = (X^T W X + kI_p)^{-1} X^T W Y \qquad (1.11)$$

$$\hat{\sigma}^2 = \frac{(Y - X\hat{\theta}_N)^T W (Y - X\hat{\theta}_N)}{n - p} \qquad (1.12)$$

The term $kI_p$ in equation (1.11) can be replaced by a diagonal matrix which has different values along the diagonal compared to equation (1.11).

To suppress noise, the derivatives $g_x$, $g_y$, and $g_t$ may be spatiotemporally smoothed, respectively, before they are used in equation (1.3). Motion vectors may also be spatially smoothed to obtain a smooth motion field.

The initial optical flow vector is smoothed in a local neighborhood to suppress noise further. The final optical flow vector is formulated as:

$$\overline{v} = \begin{pmatrix} \overline{v}_x \\ \overline{v}_y \end{pmatrix} = \sum_i m_i \begin{pmatrix} \overline{v}_{xi} \\ \overline{v}_{yi} \end{pmatrix} \qquad (1.13)$$

The algorithm assumes a constant motion model. An affine motion model is often used to incorporate tensors in a small neighborhood where pixels in a neighborhood are assumed to belong to the same motion model. To conserve hardware resources, the constant model may be used in this design. The constant model performs almost as well as the affine motion model when operating in a small neighborhood.

1.2 Optical Flow Sensor

An example of an optical flow sensor 100 that implements the optical flow algorithm that was described in section 1.1 will now be described in relation to FIGS. 1-4. The optical flow sensor 100 may be implemented in a field-programmable gate array (FPGA). FPGAs provide low power, small size, and adequate computation capability. Therefore, implementing the optical flow sensor 100 in an FPGA allows the optical flow sensor 100 to be utilized for embedded vision applications (e.g., to be installed in an unmanned vehicle for real-time applications). Alternatively, the optical flow sensor 100 may be implemented using application specific integrated circuits (ASICs) for large volume production to lower the unit cost.

As shown in FIG. 1, the optical flow sensor 100 may include two types of buses: a PLB (processor local bus) 101 and an OPB (on-chip peripheral bus) 102. High-speed modules such as a DER (DERivatives calculation) module 103, an OFC (optical flow calculation) module 104, SDRAM 105, a camera interface 106, and a USB (universal serial bus) interface 107 may be coupled to the PLB 101. Lower-speed modules such as a UART (universal asynchronous receiver/transmitter) 108, an interrupt controller 109, and a GPIO (general purpose input/output) 110 may be coupled to the OPB 102. The PLB 101 and OPB 102 may be interconnected through a bridge 111.

The optical flow sensor 100 may incorporate temporal smoothing in the pipeline. The number of frames used for temporal smoothing may depend on the available hardware and memory resources and the processing speed requirement. With temporal smoothing, multiple (e.g., three) sets of derivative frames may be stored as they are calculated and then be reloaded during the smoothing process.

To accommodate temporal smoothing, the hardware pipeline may be divided into two parts: the DER module 103, and the OFC module 104. The DER module 103 generates derivative frames and the OFC module 104 handles the rest of the calculations. Results from the DER module 103 may be stored in SRAM 112 and SDRAM 105. The DER module 103 and the OFC module 104 may share the high-speed SRAM 112 through a multi-port SRAM arbiter 113. The OFC module 104 may store the resulting motion vectors in SDRAM 105. The intermediate or final results can be transferred to a host computer via the USB interface 107. A graphical user interface may be utilized to observe and store the video and display status variables that are transferred from the optical flow sensor 100. The DER module 103 and the OFC module 104 should be managed to synchronize their computation tasks and handle exceptions such as dropped frames. The optical flow sensor 100 includes one or more built-in, on-chip processors, and software running on the processor(s) that is used for this management task.

Figure 2:
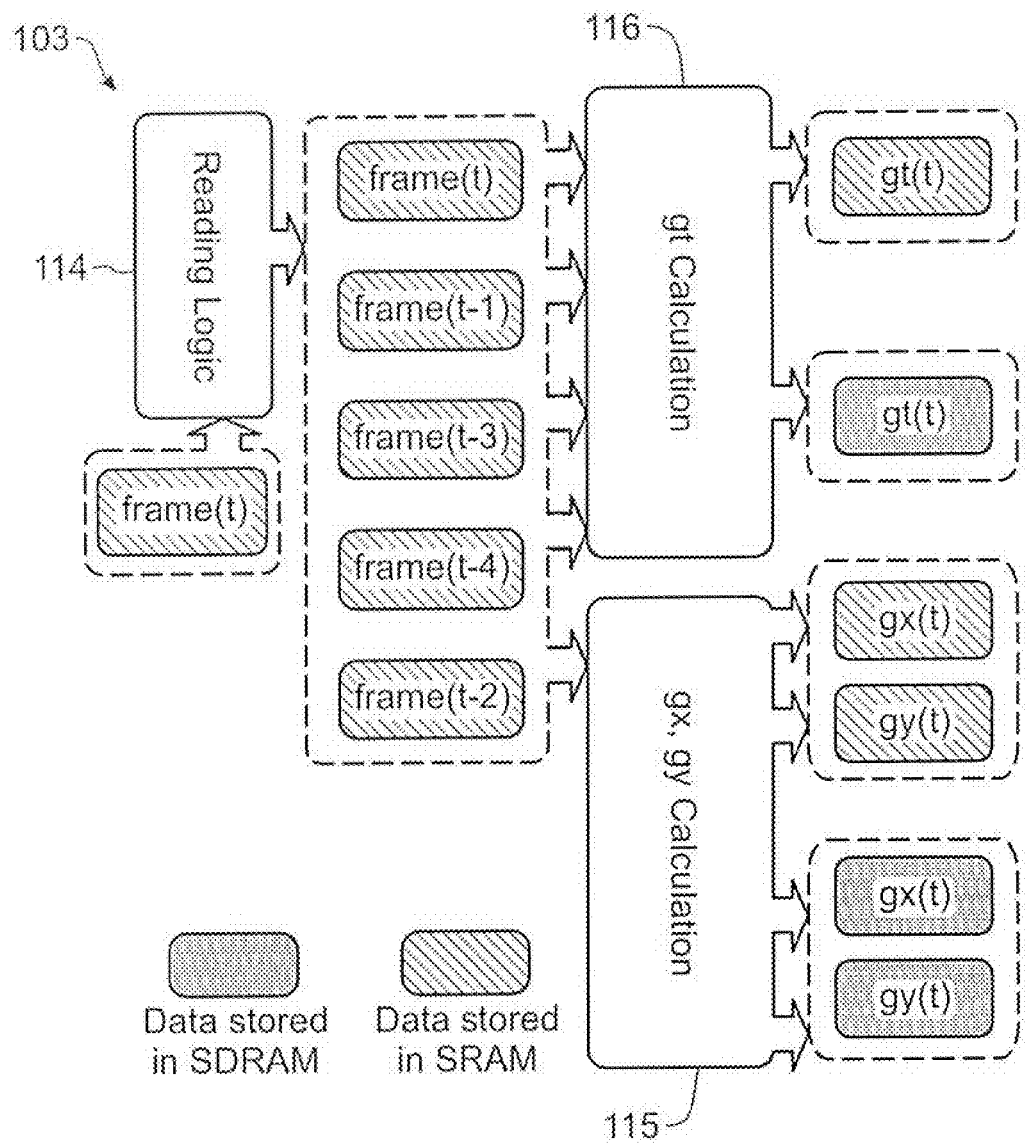
FIG. 2 illustrates a derivative calculation module from the optical flow sensor of FIG. 1.

FIG. 2 illustrates an example of the DER module 103. The DER module 103 may be configured so that every cycle when a new image frame(t) is captured directly into the SDRAM 105 through the PLB 101, reading logic 114 reads the captured image from the SDRAM 105 into a pipeline and stores it in the SRAM 112. If three frames are used for temporal smoothing, then $g_x$ and $g_y$ may be calculated 115 from frame (t−2) and $g_t$ may be calculated 116 from frame(t−4), frame (t−3), frame(t−1) and the current incoming frame(t). A series-designed first-order derivative operator of radius two, such as the one given by equation (1.14), may be utilized for these calculations.

$$D = \frac{1}{12}(1 \quad -8 \quad 0 \quad 8 \quad -1) \qquad (1.14)$$

Thus, whenever there are five consecutive image frames stored in the SRAM 112, these frames may all be read out for computing the derivative frames $g_x$, $g_y$, and $g_t$. The resulting derivative frames may be stored in the SRAM 112 as well as the SDRAM 105 for future usage. The duplicate copy stored in the SDRAM 105 may be used for temporal smoothing for future frames. If the hardware platform that is used has sufficient SRAM 112, then all nine derivative frames (three sets of $g_x$, $g_y$ and $g_t$) could be stored in the SRAM 112 and take advantage of a high-speed multi-port memory interface.

Figure 3:
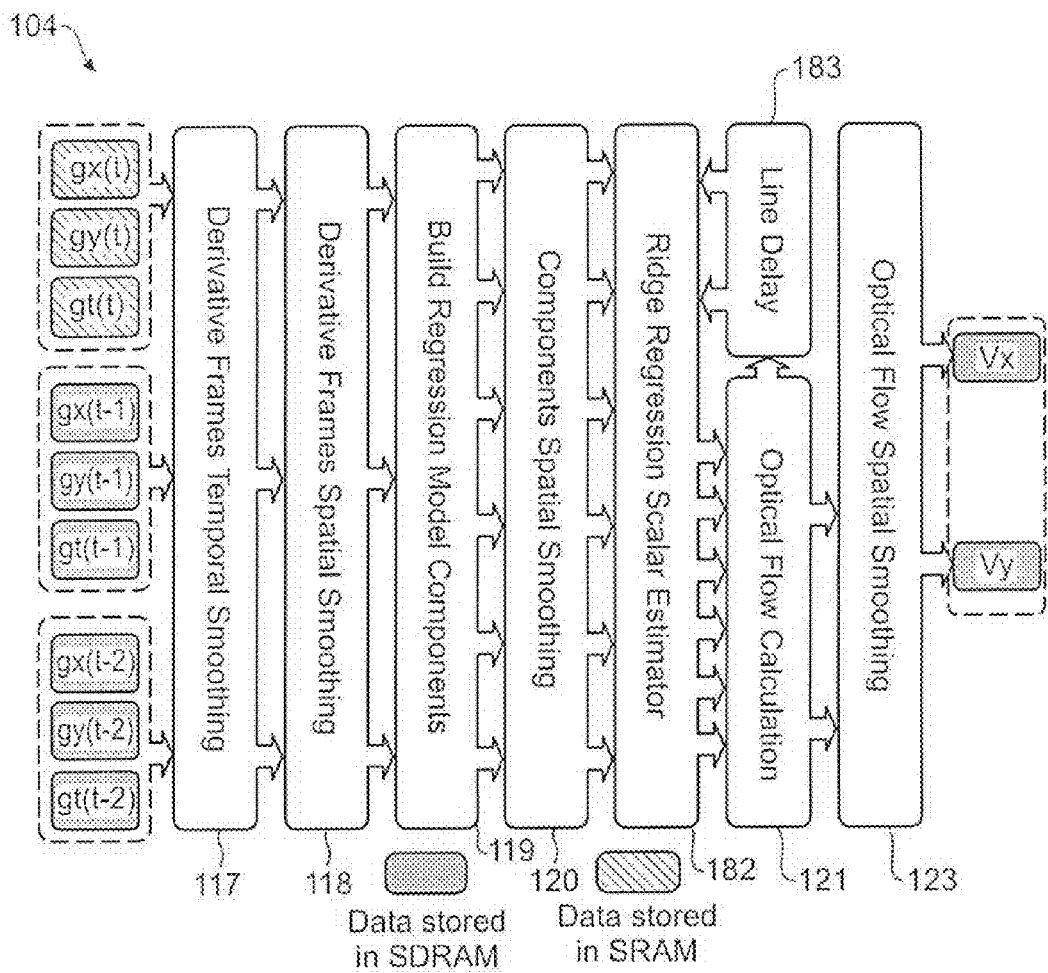
FIG. 3 illustrates an optical flow calculation module from the optical flow sensor of FIG. 1.

FIG. 3 illustrates an example of the OFC module 104. The optical flow sensor 100 may be configured so that once a new set of derivative frames is calculated, software triggers the OFC module 104 to start the calculation of optical flow. In an implementation where the size of the temporal smoothing mask is three, derivative frames for the current frame in the SRAM 112 ($g_x(t)$, $g_y(t)$ and $g_t(t)$) and the derivative frames already stored in the SDRAM 105 ($g_x(t-1)$, $g_y(t-1)$ and $g_t(t-1)$) and ($g_x(t-2)$, $g_y(t-2)$ and $g_t(t-2)$) may be read into the pipeline for temporal smoothing. Derivative frames at time t, t−1, t−2 may be temporally smoothed 117 and then spatially smoothed 118 to obtain the smoothed derivative frames for the current frame at time t. The smoothed derivative frames may be referred to as gx_t, gy_t, and gt_t. For temporal smoothing, a 1D Gaussian mask $w_2(t)$ may be convolved with the derivative frames. For spatial smoothing, a 2D Gaussian mask $w_1(x,y)$ may be used. The equation for gx_t may be shown as gx_t=$\Sigma_{x,y} w_1(x,y) \cdot$ gx_t(x,y)=$\Sigma_{x,y} w_1(x,y) \cdot (\Sigma_t w_2(x, y, t) \cdot gx(x, y, t))$. The equations for gy_t and gt_t may be similar to the equation for gx_t.

The smoothed derivative frames gx_t, gy_t, and gt_t may be used to build 119 regression model components, i.e., construct a tensor for each pixel in the current frame. The tensor for a particular pixel may include elements $t_1$-$t_6$ and may be formulated as:

$$T = \begin{pmatrix} t_1 & t_4 & t_5 \\ t_4 & t_2 & t_6 \\ t_5 & t_6 & t_3 \end{pmatrix} \qquad (1.15)$$

The diagonal component in the tensor matrix (1.15) may be added with an offset k, as shown in (1.16).

$$= \begin{pmatrix} t_1+k & t_4 & t_5 \\ t_4 & t_2+k & t_6 \\ t_5 & t_6 & t_3+k \end{pmatrix} \qquad (1.16)$$

Spatial smoothing may be performed 120 on the tensor elements $t_1$-$t_6$. In addition, the scalar k may be estimated 182 (e.g., using equation (1.9)). The smoothed tensor elements and the scalar k may be used to calculate 121 optical flow values. The optical flow values may be calculated in accordance with equation (1.11) above.

Smoothing mask parameters may be determined by factors such as mask shape, mask size, and mask kernel components. In one implementation, the size of the smoothing mask that is used to perform spatial smoothing 118 on the derivative frames is 5-by-5, the size of the smoothing mask that is used to perform spatial smoothing 120 on the tensor elements is 3-by-3, and the size of the smoothing mask that is used to perform spatial smoothing 123 on the optical flow values is 7-by-7.

As for mask shape, a square mask may be used for the sake of simplicity and efficiency. Parameters of all the smoothing masks may be in the shape of a Gaussian function. To save hardware resources, a 2D Gaussian mask may be decomposed into two 1D Gaussian masks which are cascaded and convolved along the x and y directions separately.

Figure 4:
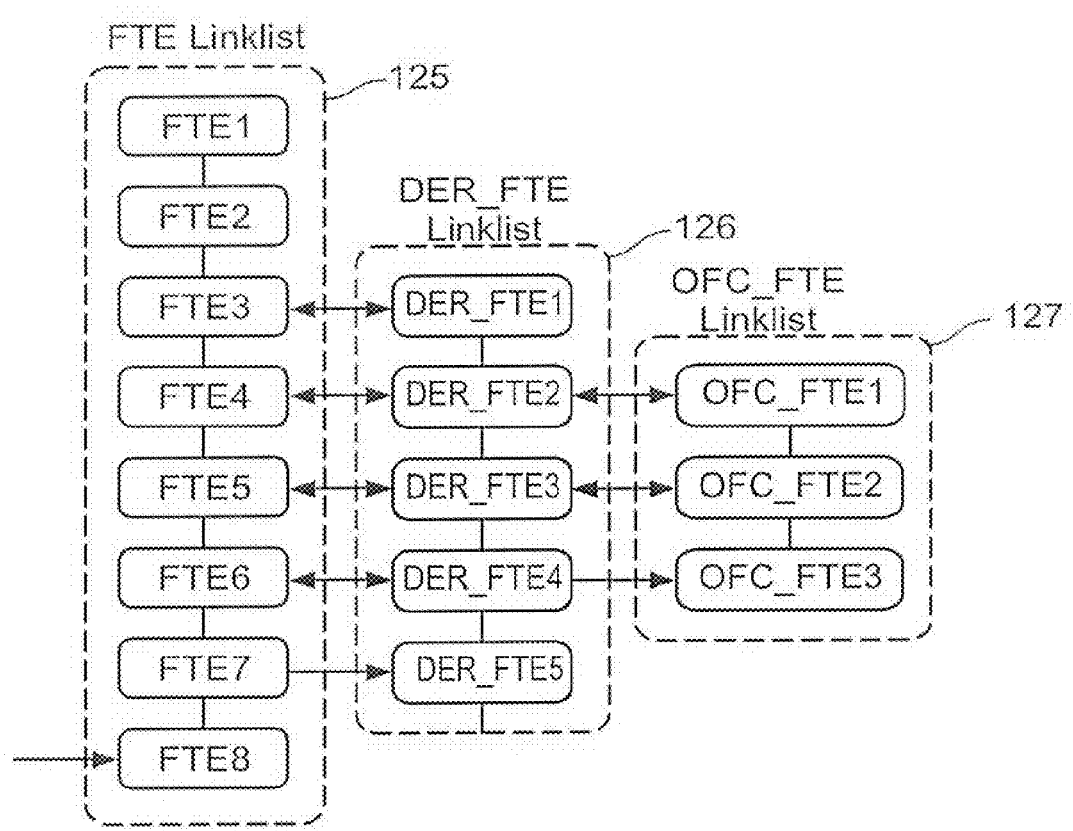
FIG. 4 illustrates linked lists that may be utilized by software that is running on the optical flow sensor of FIG. 1.

There may be three types of frames in the system: (1) image frames captured by the camera, (2) derivative frames calculated by the DER module 103, and (3) optical flow fields calculated by the OFC module 104. The DER module 103 may use the raw images as input and the OFC module 104 may use the output from the DER module 103 (derivative frames) as the input. As shown in FIG. 4, three linked lists may be used to store these frames and maintain their temporal correspondence. An FTE (frame table entry) linked list 125 may be used to store image frames, a DER_FTE linked list 126 may be used to store derivative frames, and an OFC_FTE linked list 127 may be used to store optical flow frames. In one implementation, there may be five corresponding pairs of frames in the FTE linked list 125 and the DER_FTE linked list 126, and there may be three corresponding pairs of frames in the DER_FTE linked list 126 and the OFC_FTE linked list 127.

The software that is running on the optical flow sensor 100 may include an FTE interrupt handler and a DER_FTE interrupt handler. When a new raw image is captured (e.g., FTE7), the camera core may invoke an interrupt. This interrupt may be sensed by the FTE interrupt handler and a trigger signal may be generated and sent to the DER module 103 to initiate a derivative computation. When a new set of derivative frames is calculated (e.g., DER_FTE4), the DER module 103 may invoke an interrupt. This interrupt may be sensed by the DER_FTE interrupt handler and a trigger signal may be generated and sent to the OFC module 104 to initiate an optical flow computation.

2. Obstacle Detection for an Unmanned Ground Vehicle Using Optical Flow

2.1 Algorithm Formulation

The algorithm that is developed in this section relies on the following assumption:

Assumption #1: The vehicle moves on a planar ground plane. This assumption is true for vehicle under most circumstances and it limits the degrees of freedom of the vehicle moving on this plane.

2.1.1 Motion Model Deduction

Figure 5:
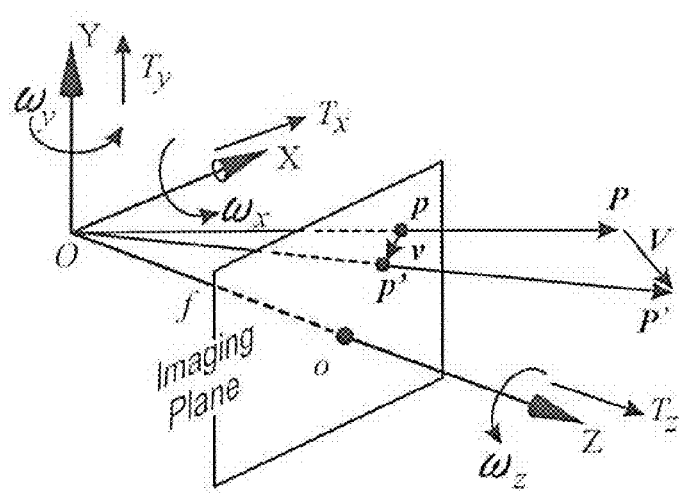
FIG. 5 illustrates a point $P=(X,Y,Z)^T$ in the camera frame being projected onto $p=(x, y, f)^T$ on the image frame.

Optical flow is a 2D projection of 3D motion in the world on the image plane. The camera frame model depicts the spatial relationship between one point in the world and the camera. Suppose at time t, a point $P=(X, Y, Z)^T$ in the camera frame is projected onto $p=(x, y, f)^T$ on the image frame where f is the focal length as shown in FIG. 5. Three projection models can be used to model the projection from the camera frame to the image frame: the perspective projection model, the weak perspective projection model, and the pinhole camera model. In the present disclosure, a perspective projection model is used because it is the closest to the physical model of the three. In the perspective projection model:

$$p = f\frac{P}{Z} \quad (2.1)$$

At time t', it will be assumed that a point P moves to P'=(X', Y',Z')$^T$ which is p'=(x', y', f)$^T$ on the image frame. The motion vector in the 3D world is V=(P−P')$^T$=(X−X', Y−Y', Z−Z')$^T$. On the image plane, the 2D projected motion vector (optical flow) can be represented as v=(p−p')$^T$=(x−x', y−y', 0)$^T$. Because the third component of v (the focal length f) is cancelled out, v=(p−p')T=(x−x', y−y')$^T$ is used instead.

Rigid motion for one point in the camera frame could be formulated as:

$$v = -T - \omega \times P \quad (2.2)$$

where T=(T$_x$, T$_y$, T$_z$)$^T$ is the translational component and ω=(ω$_x$, ω$_y$, ω$_z$)$^T$ is the rotational component.

Each component of V can be represented as:

$$V_x = -T_x - \omega_y Z + \omega_z Y$$

$$V_y = -T_y - \omega_z X + \omega_x Z$$

$$V_z = -T_z - \omega_x Y + \omega_y X \quad (2.3)$$

To convert the motion in the camera frame to optical flow, which is the projected motion on the image plane, the derivative of equation (2.1) can be calculated as:

$$v = \frac{dp}{dt} = f\frac{ZV - V_Z P}{Z^2} \quad (2.4)$$

By combining equations (2.3) and (2.4), components of v are derived as:

$$\begin{pmatrix} v_x \\ v_y \end{pmatrix} = \frac{\omega_x}{f}\begin{pmatrix} xy \\ y^2 + f^2 \end{pmatrix} + \frac{\omega_y}{f}\begin{pmatrix} -x^2 - f^2 \\ -xy \end{pmatrix} + \omega_z \begin{pmatrix} y \\ -x \end{pmatrix} + \frac{1}{Z}\begin{pmatrix} T_z x - T_x f \\ T_z y - T_y f \end{pmatrix} \quad (2.5)$$

Figure 6:
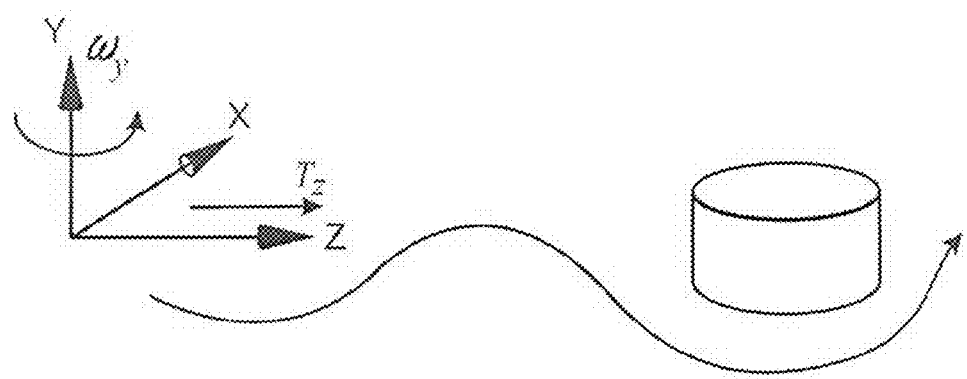
FIG. 6 illustrates two parameters—namely $(\omega_y, T_Z)$—that may be utilized for obstacle detection for a forward-looking camera mounted on a ground vehicle traveling on a planar surface.

There are six motion parameters representing the rigid motion of one point in the camera frame. Retrieving all these six motion parameters from the two components (i.e., v$_x$ and v$_y$) of the optical flow vector is an ill-conditioned problem. It would be even harder to classify based on these motion parameters. Therefore, to improve this situation, motion patterns are often restricted to a certain number of degrees of freedom for specific applications. For ground vehicle applications, it is usually assumed that the vehicle travels on a planar surface. It was determined that two parameters—namely (ω$_y$,T$_z$) as shown in FIG. 6—could work well for obstacle detection for a forward-looking camera mounted on a ground vehicle traveling on a planar surface. More importantly, with this two-parameter setting, the obstacle detection algorithm only requires simple linear algebra which can be efficiently implemented in hardware for real-time performance. Equation (2.5) can be reorganized as:

$$\begin{pmatrix} v_x \\ v_y \end{pmatrix} = \frac{\omega_y}{f}\begin{pmatrix} -x^2 - f^2 \\ -xy \end{pmatrix} + \frac{1}{Z}\begin{pmatrix} T_z x \\ T_z y \end{pmatrix} \quad (2.6)$$

This equation is composed of two parts, rotation and translation. The rotational component is associated with ω$_y$ and the translational component is associated with T$_z$. As seen in equation (2.6), the rotational component does not carry any depth information. The translational motion is the one containing the depth information. The translational component should be decoupled from the rotational component first so that the de-rotated motion field can be analyzed to determine the obstacle's distance to the camera. With the description above, the obstacle detection problem can be defined in the following manner: Given a sequence of optical flow fields, estimate the two motion parameters yaw ω$_y$ and forward translation T$_z$ according to the planar surface assumption and identify pixels with an inconsistent motion pattern as obstacles. This algorithm attempts to estimate the parameters one at a time and can be decomposed into three steps: de-rotation (estimate ω$_y$), de-translation (estimate T$_z$) and post-processing (identify inconsistent points).

Before proceeding, two more assumptions will be made.

Assumption #2: The ground plane occupies a dominant region of the image. With this assumption, it can be assumed that the ground motion parameters can be extracted from the optical flow field that contains obstacle pixels with inconsistent motion.

Assumption #3: The XZ plane of the camera frame is parallel to the ground plane. This assumption is valid if the camera is mounted on the vehicle correctly.

2.1.2 De-Rotation

The motion field is studied first without any obstacle. With assumptions #1 and #2, it is shown below that on the image plane, depth is related to the y coordinate and is independent of the x coordinate. Because the ground plane is in parallel with the XZ plane, in the camera frame the ground plane is formulated as:

$$G: Y = Y_0 \quad (2.7)$$

A line $l_0$ on the ground plane with the depth $Z_0$ is:

$$L: \begin{cases} Y = Y_0 \\ Z = Z_0 \end{cases} \quad (2.8)$$

and points on this line satisfy P=(X, Y$_0$, Z$_0$)$^T$. According to projection equation (2.1), mapping of P on the image plane is:

$$p = f\frac{P}{Z_0} = \left(f\frac{X}{Z_0}, f\frac{Y_0}{Z_0}, f\right)^T \quad (2.9)$$

Equation (2.9) depicts that line L with depth $Z_0$ on the ground plane is mapped to $$l: y = f\frac{Y_0}{Z_0}$$

on the image plane if assumptions #1 and #2 are both satisfied. In other words, the depth of line L can be inferred solely based on its y coordinate on the image plane and its depth $Z_0$ is independent of x.

With the above observation, by extracting the v$_y$ component in equation (2.6), the partial derivative of v$_y$ can be derived as:

$$\frac{\partial v_y}{\partial x} = -\frac{\omega_y}{f} y + \partial\left(\frac{T_z y}{Z}\right)/\partial x \quad (2.10)$$

$$= -\frac{\omega_y}{f} y = \beta$$

where $\beta$ is the slope ratio for $v_y$. $\beta$ is fixed for each row, if depth Z is not a function of x. This is true if assumptions #1 and #2 are satisfied. Denoting $(v_{x_{i,j}}, v_{y_{i,j}})$ as the optical flow at pixel (i,j), one $\beta_j$ can be calculated for each row of the optical flow fields while $\omega_{y_j}$ should be the same for all rows. Least squares (LS) estimation is used to correctly estimate $\beta_j$. For row j:

$$v_{y_{i,j}} = \beta_j x_i + \alpha_j \quad (2.11)$$

where $$\alpha_j = \frac{T_z}{Z_j} y_j$$

is the translational component which is constant for each row. Without loss of generality, it is assumed that $i=1, 2, \ldots, 2n+1$ and $x_i = i-n-1 \epsilon[-n, n]$ and the LS solution for $\beta_j$ is:

$$\beta_j = \frac{(2n+1)\sum x_i v_{y_{i,j}} - \sum x_i \sum v_{y_{i,j}}}{(2n+1)\sum x_i^2 - (\sum x_i)^2} \quad (2.12)$$

For $\Sigma_i x_i = 0$, equation (2.12) can be simplified as:

$$\beta_j = \frac{\sum x_i v_{y_{i,j}}}{\sum x_i^2} \quad (2.13)$$

Besides $\beta_j$, a confidence index $c_j$ can be calculated for each row of the optical flow fields which measures how well this linear model matches the local signal:

$$c_j = \frac{\left(\sum s_i v_{y_{i,j}}\right)^2}{\sum x_i^2 \sum v_{y_{i,j}}^2} \quad (2.14)$$

When most pixels in one row belong to the ground plane, $c_j$ will be close to one. When an obstacle is present, because its depth is different from the ground plane, the linear model in equation (2.11) will not hold and $c_j$ will be smaller. The term $c_j$ is a good indicator of the presence of an obstacle in one row.

2.1.3 De-Translation

After the rotation parameter $\omega_y$ is obtained, the rotational component can be removed from $v_y$. From equations (2.9) and (2.11), the resulting de-rotated $v_y$ component $$v_{y_{i,j}}^R = \alpha_j = \frac{T_z}{z_j} y_j = f \frac{Y_0}{Z_j^2} T_z \quad (2.15)$$

is fixed for each row as well. Again, the true value of the translation parameter $T_z$ is not needed for obstacle detection. Instead, the goal is to identify pixels with depth values different from other pixels on each row. These pixels are considered to be part of the obstacle.

To simplify the algorithm and make it fit for hardware implementation, the mean of the de-rotated $v_y$ components is used as the translational component and the de-translated $v_y$ component for pixel (i,j) in the de-rotated optical flow fields is derived as:

$$v_{y_{i,j}}^D = v_{y_{i,j}}^R - \overline{v}_{y_j}^R = v_{y_{i,j}}^R - \frac{\sum_{k=j-m}^{k=j+m-1} \sum_{i=-n}^{i=n-1} \left(v_{y_{i,k}}^R\right)}{4mn} \quad (2.16)$$

$v_y^D$ may be calculated for each pixel in the de-rotated optical flow fields. After de-translation, if one pixel belongs to the ground plane, its de-translated motion component $v_{y_{i,j}}^D$ should be very close to zero. In comparison, a pixel on the obstacle should have a larger de-translated motion component. The post-processing step in the next section shows how obstacles can be located based on the de-translated motion component value.

2.1.4 Post-Processing

Figure 7:
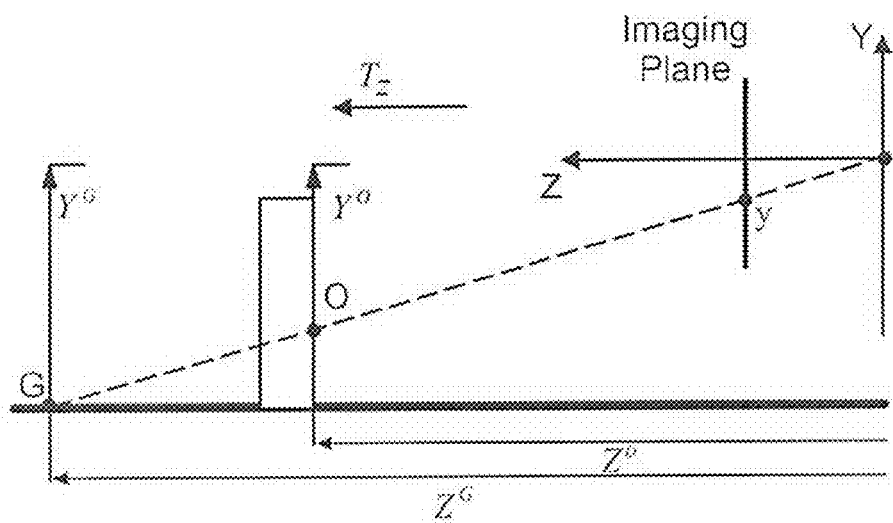
FIG. 7 illustrates that the residual motion components will ideally be zero for ground plane pixels and non-zero for obstacle pixels after the motion field is de-rotated and de-translated.

Ideally, after the motion field is de-rotated and de-translated, the residual motion components will be zero for ground plane pixels and non-zero for obstacle pixels. This is illustrated in FIG. 7. G is a visible point on the ground plane if there is no obstacle. O is the point on the obstacle that blocks point G. Based on equations (2.6) and (2.15), the projected $v_y$ motion component difference which can be measured from the optical flow estimation is formulated as:

$$v_y^\Delta = v_y^G - v_y^O = \left(\frac{1}{Z^G} - \frac{1}{Z^O}\right) T_z y \quad (2.17)$$

$$= f T_z \left(\frac{Y^G}{Z^{G2}} - \frac{Y^O}{Z^{O2}}\right)$$

$$= c f T_z \left(\frac{1}{Z^G} - \frac{1}{Z^O}\right)$$

where $$c = \frac{Y^G}{Z^G} = \frac{Y_O}{Z^O}$$

is the slope ratio for the line passing through point G and O. In equation (2.17), $Z^G$ is the depth for point G and $Z^O$ the depth for point O. As in equation (2.17), the motion difference is proportional to $T_z$ (the translational motion of the camera) and c (the line slope ratio), and the depth difference item. From equation (2.17), it can be concluded as follows. If $T_z=0$ (no translational motion), the obstacle will not be detectable which agrees with the basic idea of using a single camera for depth estimation. Also, assuming other parameters are fixed, the closer the obstacle is to the camera (smaller $Z^O$), the bigger the absolute value of equation (2.17) will be.

In practice, a threshold $\delta$ is used to convert the motion component difference image into a binary image indicating the initial obstacle detection result as shown in equation (2.18). Detecting obstacles in this manner has two advantages. First, the operations can be efficiently implemented in hardware. Second, it avoids estimating the obstacle depth $Z^O$ which is not a trivial task in many circumstances.

$$b_{init}(x, y) = \begin{cases} 1, & \text{if } v_y^A(x, y) \geq \delta; \\ 0, & \text{if } v_y^A(x, y) < \delta. \end{cases} \quad (2.18)$$

2.2 Obstacle Detection Module

An example of an obstacle detection module 200 that implements the algorithm that was described in section 2.1 will now be described in relation to FIGS. 8-10. The obstacle detection module 200 may be implemented in an FPGA or an ASIC, so that the obstacle detection module 200 may be installed in an unmanned vehicle for real-time applications.

Figure 8:
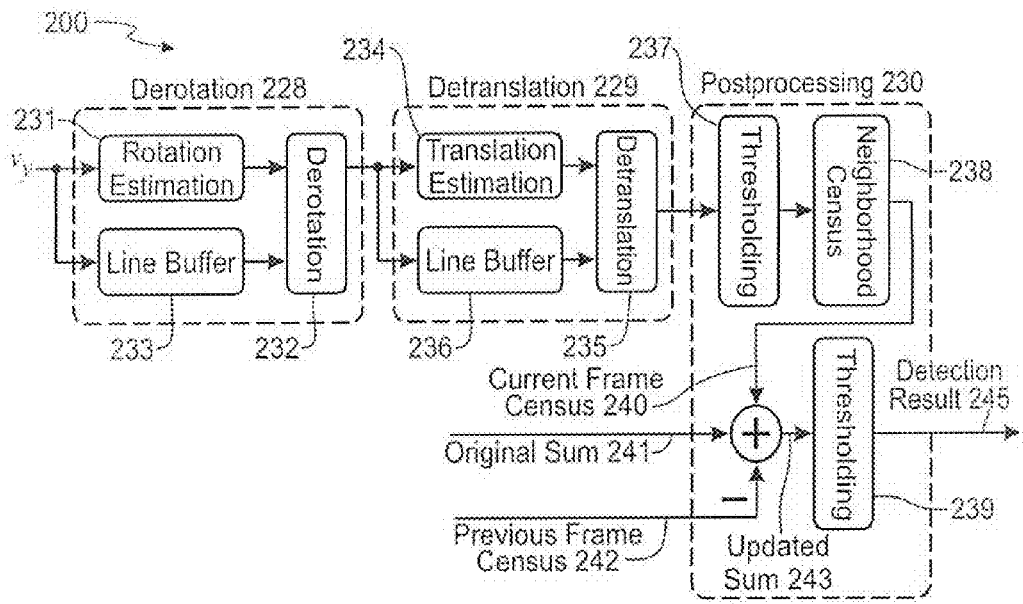
FIG. 8 illustrates an example of an obstacle detection module that implements the obstacle detection algorithm that is described in section 2.1 of the present disclosure.

As shown in FIG. 8, the obstacle detection module may be divided into three sub-modules: a de-rotation sub-module 228, a de-translation sub-module 229, and a post-processing sub-module 230. The de-rotation sub-module 228 may perform the operations of rotation estimation 231 and de-rotation 232. In addition, the de-rotation sub-module 228 may include a line buffer 233. The de-translation sub-module 229 may perform the operations of translation estimation 234 and de-translation 235. In addition, the de-translation sub-module 229 may include a line buffer 236. The post-processing sub-module 230 may perform a first thresholding operation 237, a neighborhood census operation 238, and a second thresholding operation 239. The output of the post-processing sub-module 230 is the detection result 245.

As shown in FIG. 8, the $v_y$ components of the optical flow fields are used by the de-rotation sub-module 228, the de-translation sub-module 229, and the post-processing sub-module 230. The $v_x$ components of the optical flow fields are not used by the de-rotation sub-module 228, the de-translation sub-module 229, or the post-processing sub-module 230.

The de-rotation sub-module 228, the de-translation sub-module 229, and the post-processing sub-module 230 may be fully pipelined and concatenated in the pipeline. A detailed explanation of each sub-module will be presented in the following subsections.

2.2.1 De-Rotation Sub-Module

To obtain an accurate rotation estimation, rotation parameters across multiple rows may be averaged to obtain an averaged parameter. The confidence index in equation (2.14) may be used as weights in averaging. The averaged slope ratio $\bar{\beta}$ may be expressed as:

$$\bar{\beta} = \frac{\sum_{j=1}^{N} \beta_j c_j}{\sum_{j=1}^{N} c_j} \quad (2.19)$$

Figure 9:
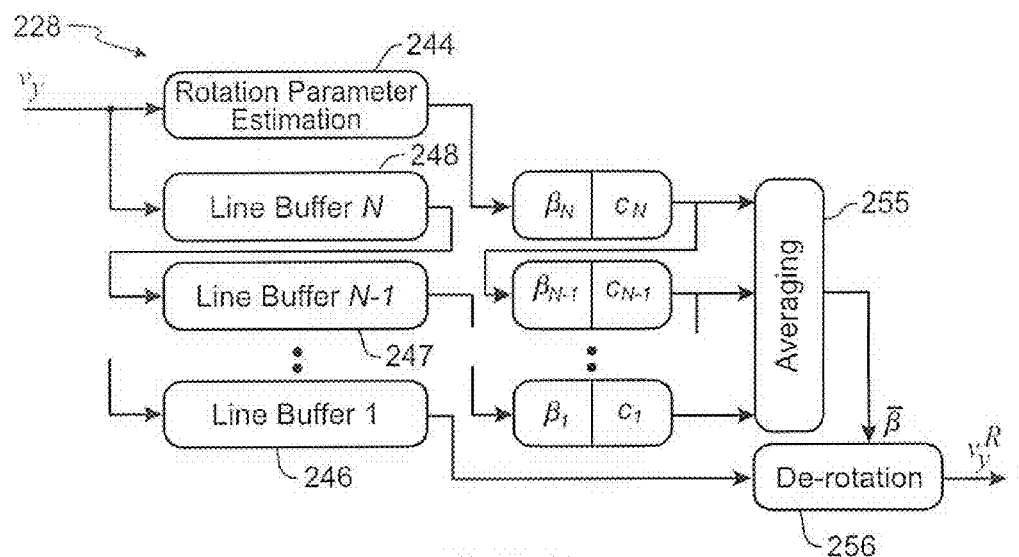
FIG. 9 illustrates the de-rotation sub-module from the obstacle detection module of FIG. 8.

The de-rotation sub-module 228 is illustrated in FIG. 9. The de-rotation sub-module 228 performs a rotation parameter estimation operation 244. The de-rotation sub-module 228 also includes N line buffers, where N is configurable. A first line buffer 246, line buffer (N−1) 247, and line buffer N 248 are shown in FIG. 9.

Pixelwise motion estimation $v_y$ is the input and it is fed into rotation parameter estimation 244 and the line buffer at the same time. Depending on the number of lines (N) to be averaged, the same number of line buffers are concatenated before $v_y$ is de-rotated. At the same time, the slope ratio $\beta_j$ and confidence index $c_j$ for each row are registered and shifted in synchronization with the line buffer. Once the N sets of $\beta_j$ and $c_j$ are ready, they are averaged as shown in equation (2.19) to obtain $\bar{\beta}$. Selection of N is a tradeoff between accuracy and processing speed. If N is small, e.g., two, $\bar{\beta}$ will be sensitive to noise or even corrupted when there are many obstacle pixels in the row. This will cause a bias in the translational component α as shown in equation (2.11) and this bias will be carried into subsequent calculations. The bias is worse for the leftmost and right-most regions in the image because $x_i$ has much bigger magnitude along the image boundary as shown in equation (2.11). If N is large, e.g., twenty, it will require hardware resources for line buffering and averaging $\beta_j$ across twenty rows. Also, when N is too big, $\beta_j$ will be over-smoothed because of the difference of y as shown in equation (2.10). In one possible implementation, N may be chosen to be eight.

The de-rotation sub-module 228 also performs an averaging operation 255. The N slope ratios and N confidence indices are provided as input to the averaging operation 255. The result of the averaging operation is $\bar{\beta}$. With $\bar{\beta}$ estimation, $v_y$ can be de-rotated to obtain $v_y^R$. $\bar{\beta}$ and the output of the first line buffer 246 are provided as input to the de-rotation operation 256. The result of the de-rotation operation 256 is $v_y^R$.

2.2.2 De-Translation Sub-Module

Similar to the de-rotation sub-module, de-translated motion is calculated in equation (2.16). The averaged translational motion is estimated by averaging the de-rotated motion component across a certain number of rows. There is also a tradeoff which is similar to the de-rotation setting. In one possible implementation, the row number is set to be eight to achieve a balance between accuracy and speed.

2.2.3 Post-Processing Sub-Module

The main purpose of post-processing is to filter out the false positives. After the $v_y$ motion component is de-rotated and de-translated, as shown in FIG. 8, it may be binarized by applying a threshold to obtain the initial detection result 245 as shown in equation (2.18). A detection result 245 may be determined for each pixel.

The binary image $b_{init}$ may be smoothed in the spatial domain and the temporal domain separately. This smoothing is shown as a neighborhood census operation 238 in FIG. 8. The assumption behind spatial and temporal smoothing is that the obstacle is coherent both spatially and temporally. By counting the initial detection results in the spatiotemporal domain, random false positives can be detected. The spatial smoothing calculates the number of initial deleted pixels in a local neighborhood. The temporal smoothing updates the number of overall initial detected pixels in the temporal domain. To efficiently calculate the sum of the detected pixels, the following equation may be applied:

$$S_c = S_I + S_p - S_f \quad (2.20)$$

where $S_c$ is the sum of the current frame (the current frame census 240 in FIG. 9), $S_I$ is the spatial sum of the current frame (i.e., the original sum 241 in FIG. 9), $S_p$ is the sum of the previous frame (i.e., the previous frame census 242 in FIG. 9), and $S_f$ is the spatial sum of the first frame in the temporal volume (i.e., the updated sum 243 in FIG. 9).

3. Obstacle Detection for an Unmanned Aerial Vehicle Using Optical Flow

Figure 10:
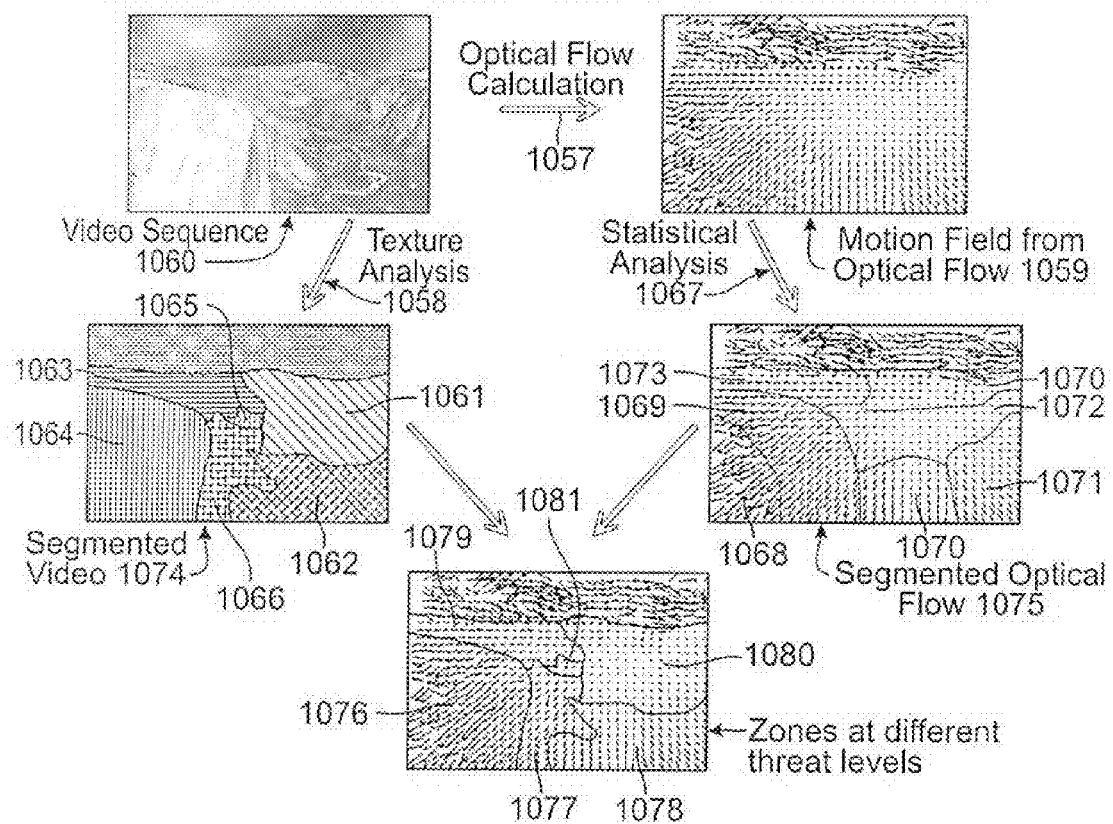
FIG. 10 illustrates an example of a method for obstacle detection for an unmanned aerial vehicle (UAV).

FIG. 10 illustrates an example of a method for obstacle detection for an unmanned aerial vehicle (UAV). A ridge-regression tensor-based algorithm may be used to calculate 1057 optical flow values to generate a motion field 1059. An example of such an algorithm was described above in section 1.

Texture analysis 1058 may be used to segment video 1060 into regions that have similar image texture. Some examples of these types of regions 1061, 1062, 1063, 1064, 1065, 1066 are shown in FIG. 10.

Statistical analysis 1067 may be used to segment the motion field 1059 into regions that have similar optical flow characteristics (e.g., vector length and orientation). Some examples of these types of regions 1068, 1069, 1070, 1071, 1072, 1073 are shown in FIG. 10.

The segmented video 1074 may be merged with the segmented motion field 1075 to generate zones at different distances from the UAV. Some examples of these types of zones 1076, 1077, 1078, 1079, 1080, 1081 are shown in FIG. 10.

Sometimes, the motion measurement is not accurate due to image noise, brightness change, occlusion, etc. Under these circumstances, other clues such as texture can be incorporated into the analysis in order to improve the accuracy. A cost function can be derived to evaluate the certainty of motion measurement. A statistical framework can be devised to measure the distribution of the measurement and infer a classification from an objective perspective.

An obstacle detection module for a UAV may be configured to perform the operations that are shown in FIG. 10. Such an obstacle detection module may be implemented in an FPGA or an ASIC. This would allow the obstacle detection module to be installed in the UAV in order to perform obstacle detection in real time.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An apparatus, comprising:
    an optical flow sensor comprising a camera interface and an optical flow calculation module that calculates a sequence of optical flow fields using a ridge estimator; and
    an obstacle detection module comprising:
        a de-rotation sub-module processor comprising a first line buffer, the de-rotation sub-module being configured to de-rotate the sequence of optical flow fields to obtain de-rotated optical flow fields;
        a de-translation sub-module processor comprising a second line buffer, the de-translation sub-module being configured to de-translate the de-rotated optical flow fields to obtain de-translated optical flow fields; and
        a post-processing sub-module processor that is configured to identify pixels with an inconsistent motion pattern as obstacles, wherein the inconsistent motion pattern is determined based on a residual motion component of a pixel compared to residual motion components of a majority of pixels of an image after de-translation;
    wherein the optical flow fields comprise $v_x$ and $v_y$ components, wherein the $v_y$ components of the optical flow fields are used for the de-rotation, the de-translation, and the identification, and wherein the $v_x$ components of the optical flow fields are not used for the de-rotation, the de-translation, or the identification.

2. The apparatus of claim 1, wherein the obstacle detection module is implemented in a field-programmable gate array (FPGA) or an application specific integrated circuit (ASIC).

3. The apparatus of claim 1, wherein the de-rotation of the sequence of optical flow fields comprises:

using least squares estimation to calculate slope ratios, wherein a slope ratio is calculated for each row of the optical flow fields;
    calculating confidence indices, wherein a confidence index is calculated for each row of the optical flow fields; and
    averaging the slope ratios over multiple rows, using the confidence indices as weights for the averaging.

4. The apparatus of claim 3, wherein:
    the calculation of the slope ratios is performed in accordance with $$\beta_j = \frac{\sum x_i v_{y_{i,j}}}{\sum x_i^2};$$

the calculation of the confidence indices is performed in accordance with $$c_j = \frac{\left(\sum x_i v_{y_{i,j}}\right)^2}{\sum x_i^2 \sum v_{y_{i,j}}^2};$$

and
the averaging is performed in accordance with $$\bar{\beta} = \frac{\sum_{j=1}^{N} \beta_j c_j}{\sum_{j=1}^{N} c_j},$$

wherein $(v_{x_{i,j}}, v_{y_{i,j}})$ is an optical flow field at pixel (i,j), $x_i = i-n-1-68\,[-n,n]$, $I=1,2,\ldots,2n+1$, and N is the number of rows being averaged.

5. The apparatus of claim 1, wherein the de-translation of the sequence of optical flow fields comprises calculating, for each pixel in the de-rotated optical flow fields, a de-translated $v_y$ component.

6. The apparatus of claim 5, wherein the calculation of the de-translated $v_y$ component for pixel (i,j) in the de-rotated optical flow fields is performed in accordance with $$v_{y_{i,j}}^D = v_{y_{i,j}}^R - \bar{v}_{y_i}^R = v_{y_{i,j}}^R - \frac{\sum_{k=j-m}^{k=j+m-1} \sum_{i=-n}^{i=n-1} \left(v_{y_{i,k}}^R\right)}{4mn},$$

wherein $v_{y_{i,j}}^R$ is the de-rotated $v_y$ component of optical flow field for pixel (i,j), and $\bar{v}_{y_i}^R$ is a mean of de-rotated $v_y$ component of optical flow fields over 4 mn pixels.

7. The apparatus of claim 1, wherein the identification of the pixels with the inconsistent motion pattern comprises binarizing the de-rotated and de-translated $v_y$ components by applying a threshold.

8. The apparatus of claim 7, wherein the binarizing of the de-rotated and de-translated $v_y$ components is performed in accordance with $$b_{init}(x, y) = \begin{cases} 1, & \text{if } v_y^A(x, y) \geq \delta; \\ 0, & \text{if } v_y^A(x, y) < \delta \end{cases}.$$

9. The apparatus of claim 1, wherein a slope ratio is estimated for each row, and a de-rotated $v_y$ component of the optical flow fields is obtained based on an averaged slope ratio over a predetermined number of rows.

10. The apparatus of claim 9, wherein a mean of de-rotated $v_y$ components of the optical flow fields over the predetermined number of rows is used as a translational component for each pixel.

11. The apparatus of claim 9, wherein the predetermined number of rows is eight.

* * * * *